United States Patent
Jenkin et al.

(10) Patent No.: US 8,599,269 B1
(45) Date of Patent: Dec. 3, 2013

(54) DIGITAL CAMERA TESTING FOR DARK SIGNAL NON-UNIFORMITY

(71) Applicant: Apple Inc., Cupertino, CA (US)

(72) Inventors: Robin B. Jenkin, Morgan Hill, CA (US); Hongqin Zhang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/784,500

(22) Filed: Mar. 4, 2013

Related U.S. Application Data

(60) Provisional application No. 61/699,088, filed on Sep. 10, 2012.

(51) Int. Cl.
*H04N 17/02* (2006.01)

(52) U.S. Cl.
USPC .......................................... 348/187; 348/180

(58) Field of Classification Search
USPC ........... 348/187, 180, 181, 188; 702/116, 108
IPC .............................................. H04N 17/00, 17/02
See application file for complete search history.

(56) References Cited

U.S. PATENT DOCUMENTS

| | | | |
|---|---|---|---|
| 7,486,309 B2 * | 2/2009 | Knoedgen et al. | 348/187 |
| 7,747,081 B2 | 6/2010 | Moody et al. | |
| 2004/0189836 A1 | 9/2004 | Spears et al. | |
| 2010/0237149 A1 | 9/2010 | Olmstead | |
| 2011/0074961 A1 * | 3/2011 | Lee | 348/187 |

\* cited by examiner

*Primary Examiner* — Sherrie Hsia
(74) *Attorney, Agent, or Firm* — Blakely, Sokoloff, Taylor & Zafman LLP

(57) ABSTRACT

The embodiments of the invention here are automated systems and processes for testing a camera device. The processes can detect dark signal non-uniformity (DSNU) within a digital image that has been captured by a solid-state imaging sensor of the camera device under test. Techniques that may be able to detecting localized and global color drifts of various shapes have been described and claimed.

13 Claims, 5 Drawing Sheets

DIGITAL CAMERA TESTING FOR DARK SIGNAL NON-UNIFORMITY

This application claims the benefit of the earlier filing date of provisional application No. 61/699,088 filed Sep. 10, 2012.

An embodiment of the invention is related to techniques for detecting dark signal non-uniformity (DSNU) of a digital camera, by image processing of digital images produced by the camera. Other embodiments are also described.

BACKGROUND

There are various defects that appear during the manufacturing of digital cameras. One serious defect (that can result in a camera specimen being rejected during manufacture testing) is dark signal non-uniformity (DSNU). This defect may be manifested as a blob that appears when a digital image of a test scene captured by a unit or device under test (DUT) is displayed. The blob may be of any shape and usually appears as a color drift. Image processing-based detection algorithms are available that can be used to screen out DUTs whose test images exhibit the symptoms of such defects. A goal of such algorithms is to flag only those units that have the defects; efforts are under way to improve the accuracy of such algorithms, so as to reduce the likelihood of false positives, and to yield faster manufacture testing algorithms.

SUMMARY

Computerized methods and systems suitable for detecting DSNU of a camera module are described, using four metrics A-D. In one embodiment (metric A), the constituent color planes of an original image are separated and converted into respective lower resolution images. Each of the respective lower resolution images is processed to find the largest pixel value therein and the smallest pixel value therein, and a difference between the largest and smallest pixel values is computed. The computed difference for each of the respective lower resolution images is compared with a threshold, and a pass or fail is signaled in response. Other embodiments are also described including metrics C-D that can be used together with metric A as an overall DSNU test, or that can be used individually for example as part of other automated camera device testing methodologies.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description. Also, while processes are described here using examples, the order in which the constituent operations of a given process can occur could be different than what is actually described here in the Detailed Description section.

The embodiments of the invention here are automated systems and processes for testing a camera device. The camera device may be a digital camera module that can be integrated into a consumer electronic device or into any other electronic component or device in which digital camera functionality may be embedded, including professional digital video and still cameras. The processes can detect dark signal non-uniformity (DSNU) within a digital image that has been captured by a solid-state imaging sensor of the camera device under test (DUT). The DSNU methodologies described here are based on the DUT taking images of a scene that is completely dark. Both localized and global color drifts of various shapes may be detected. One or more of the techniques described here may be better able to distinguish normal specimens from bad specimens, thereby improving the yield of a production line by reducing the incidence of false positives, as well as reducing the total test time per DUT.

Figure 1:
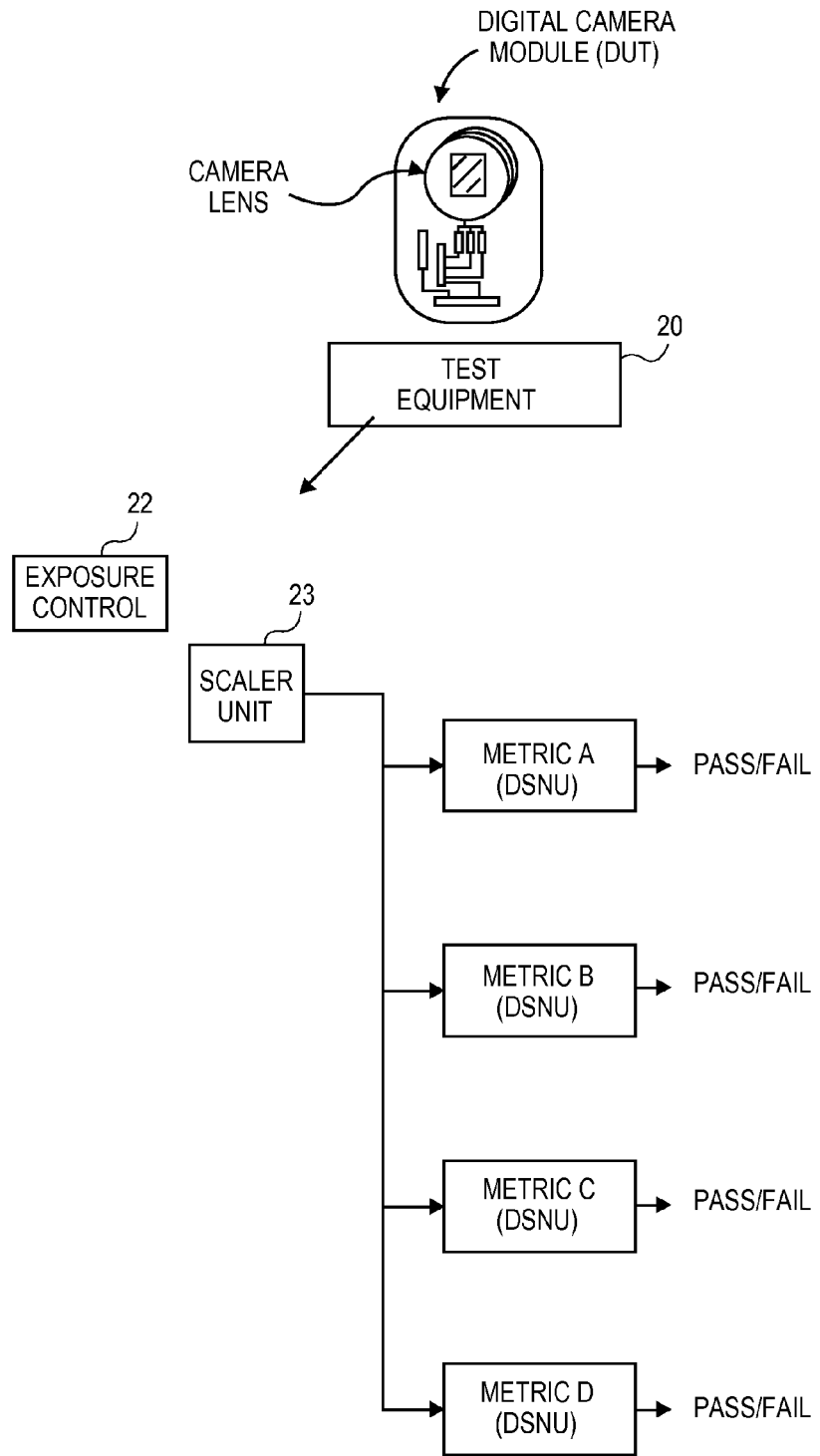
FIG. 1 is a block diagram of a camera testing system.

FIG. 1 is an example of a computerized test system that may be deployed in a manufacturing test environment for testing high volume manufactured camera DUTs. In this particular example, the DUT is a digital camera module such as one that can be integrated or embedded into a host device such as a portable consumer electronic device, e.g. a smart phone, a tablet computer or a laptop computer. In other cases, the DUT may actually be the host device (whose digital camera functionality is being tested). The test system includes electronic automatic test equipment 20 that has a digital communications interface that can use a wired or wireless link to a counterpart communications interface in the DUT, to read digital images captured by an imaging sensor of the DUT and to pass test commands to the imaging sensor. Examples of the interface include a dedicated-for-testing digital serial communications interface, a general-purpose wired computer peripheral interface such as a Universal Serial Bus (USB) interface, and a wireless link such as one that uses a Bluetooth protocol. The test equipment 20 includes a programmable processor that is to be programmed in accordance with software routines that (when executed by the processor) perform the digital image processing or test computations described below upon a captured digital image from each DUT, and provide an indication as to whether or not the DUT has passed the test. The functionality of such routines can alternatively be obtained by hardwired logic circuitry, e.g. hardwired state machines and digital filter blocks.

The test routines may include an exposure control unit 22 that may originate testing commands that the test equipment sends to the DUT, such as a shutter release signal to take a digital picture. The exposure control unit 22 may then receive one or more captured raw digital images from the DUT that were taken in response to the shutter release signal. As indicated above, when testing for DSNU, the DUT is facing a completely dark scene. This may be achieved by covering the imaging lens entrance surface of the DUT to essentially allow no light into the imaging path (e.g., closing off an external protective diaphragm), or by placing the DUT inside a chamber that allows essentially no light in.

The test routines may also include a scaler unit 23 that spatially scales the raw digital image to a lower resolution, for purposes of complexity reduction and de-noising. Note that the raw digital image may have full frame resolution of the capturing imaging sensor in the DUT. The imaging sensor (and hence the raw digital image) may have a color Bayer pattern, or other color mosaic or color filter array pattern, such that the raw digital image may be made of several color component planes or channels, e.g. red, green1, green2, and blue. The individual, scaled color component channels are then automatically processed by several digital image processing evaluation routines or modules. Each of these is designed to compute a respective metric or measure of the performance of the DUT, namely metrics A-D, and to compare the computed metric with one or more thresholds. A result of the comparison can indicate that the DUT has either passed or failed that particular routine, where a failure in turn can be interpreted to mean that the DUT should be rejected from a production batch of similar specimens.

A testing process conducted by an evaluation routine may begin with the exposure control unit 23 signaling the DUT to capture an original digital image 3 of a completely dark scene condition. The original digital image 3 in theory will have essentially uniform pixels (essentially the same intensity values) across the entire image. In practice however, defects appear as several adjacent rows or columns of pixels that are somewhat darker or brighter than the surrounding areas, and that are considered serious defects whose detection may lead to the rejection of the DUT.

Figure 2:
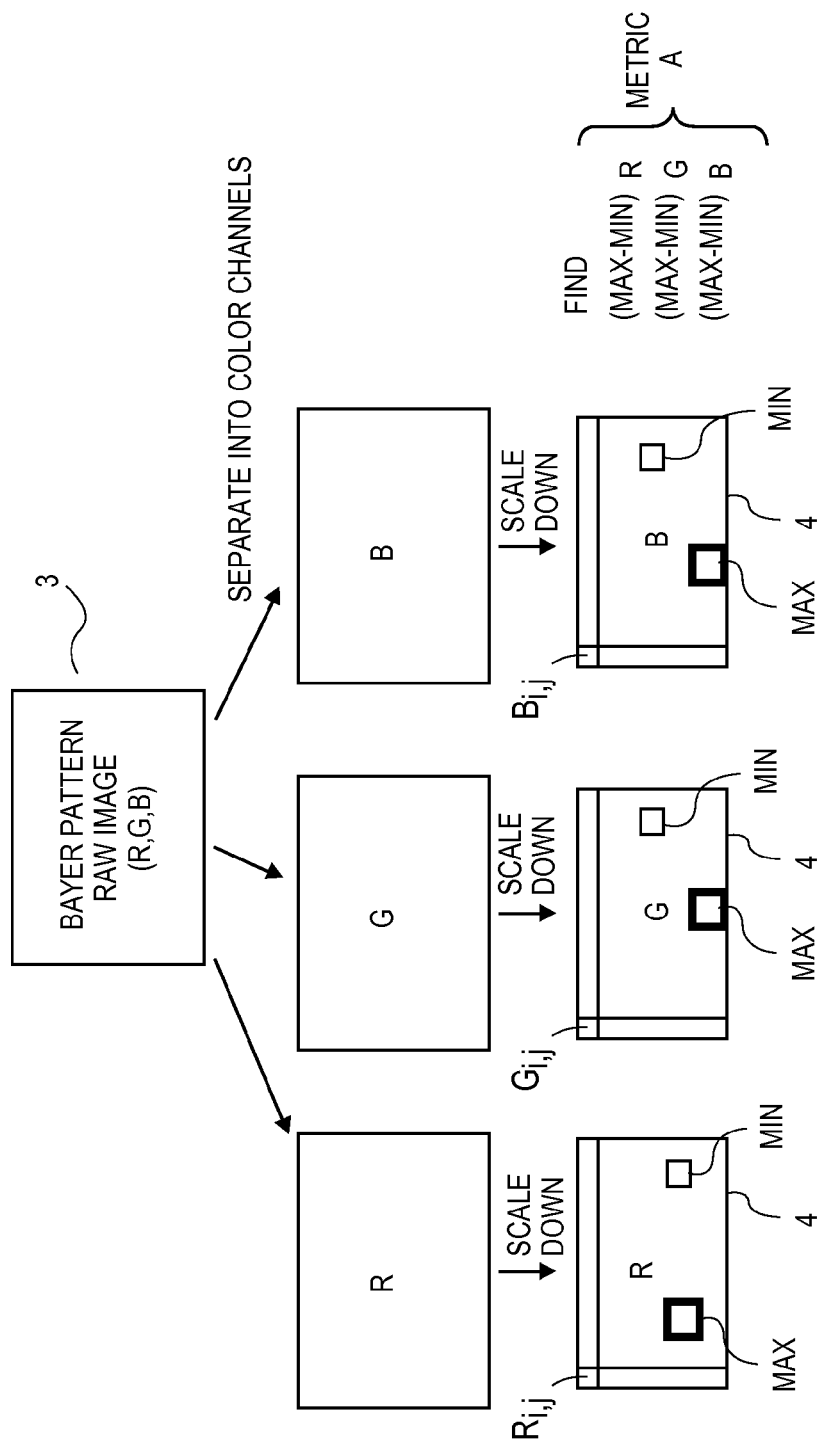
FIG. 2 depicts metric A of a digital camera testing methodology.

FIGS. 2-5 show example computations for four Metrics A-D that are suitable for digital camera testing, and in particular for testing DSNU. Referring to FIG. 2, this figure shows a block diagram of an example evaluation routine that computes metric A. In this example, the original image 3 is a Bayer color mosaic or Bayer color filter array (CFA) pattern raw image. In one embodiment, the original digital image 3 is a raw image, i.e. it has been minimally processed in that it is not ready for use by a higher level bitmap graphics editor or by a Web browser. One or more constituent color planes may then be separated from the CFA pattern raw image 3, as shown. The following image processing may then be performed separately, upon every one of the constituent color planes. In this case, the original four color planes or channels red, green1, green2 and blue have been converted into three R, G, and B channels by combining the two green channels into one.

First, the selected color plane is scaled down to a smaller size (lower resolution) scaled image 4, to obtain some noise reduction and also reduce subsequent computation time. To do so, in one instance, the selected, raw color plane may be divided into multiple blocks or regions of interest (ROIs) each having m×n pixels, e.g. 3×3. Each ROI may then be averaged or otherwise processed into a single value (which may still be referred to here as a "pixel" value) that represents a central tendency of the block or ROI. The size of the ROI, or scale factor, may be different for each project and can depend on image sensor cell sensitivity and the full frame resolution of the image sensor. Additional spatial noise reduction techniques may be included at this stage of image processing, to produce the lower resolution or scaled image 4.

For Metric A, the greatest pixel value (Max) and the smallest pixel value (Min) in the scaled image 4 are found, for a given color channel, and their difference is computed. Here, this is performed for all three color planes, resulting in a Metric A having three values, namely $(Max-Min)_R$, $(Max-Min)_G$, and $(Max-Min)_B$. If any of these values is greater than a threshold (where a different threshold may be selected for each color channel), then the DUT is marked as failing the test. In one embodiment, Metric A is computed for all three, color channels, and if any one of them is too large then the DUT is marked as a failing unit that can be rejected from the production line.

Figure 3:
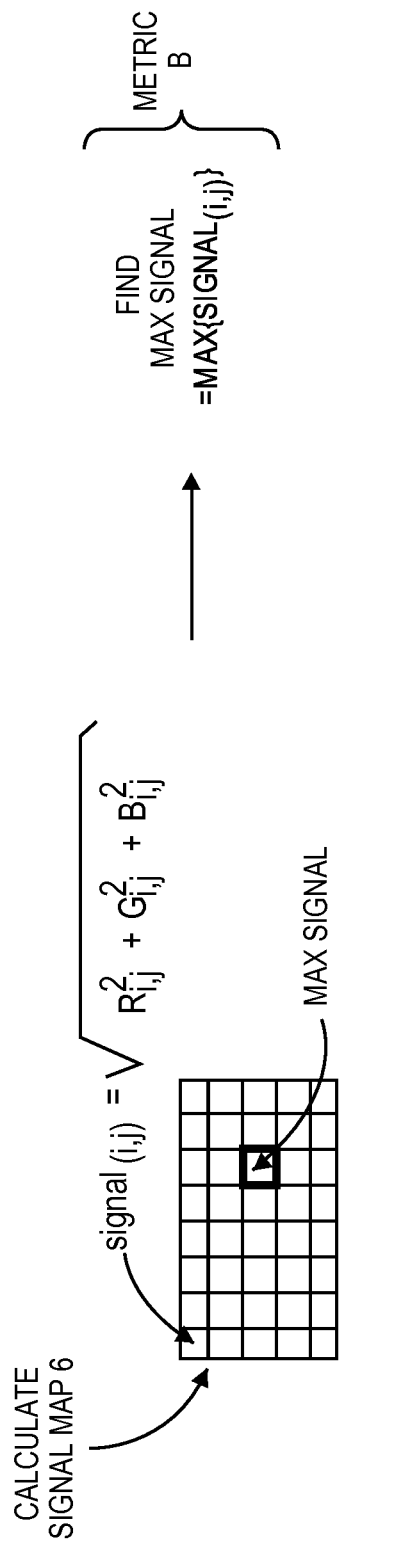
FIG. 3 depicts metric B of a digital camera testing methodology.

Referring now to FIG. 3, to compute Metric B, a Signal map 6 is first computed using the scaled images 4 of all of the color channels (see FIG. 2). Each value of the Signal map 6 may be given by the equation shown in FIG. 3, which is an example of a more general measure of the combined or aggregate intensity of the color components (not an interpolated or de-mosaiced full color pixel) at a given ROI location i,j. Although the equation used here defines signal(i,j) as the square root of the sum of the squares of the three color components at location (i,j), a different measure of the aggregate intensity (reflecting all of the color planes) may alternatively be used. The greatest value in the Signal map 6 is then found—this is Metric B, referred to as MaxSignal. If MaxSignal is too large (greater than a threshold), the DUT is marked as having failed the test in that it can be rejected from the production line.

Figure 4:
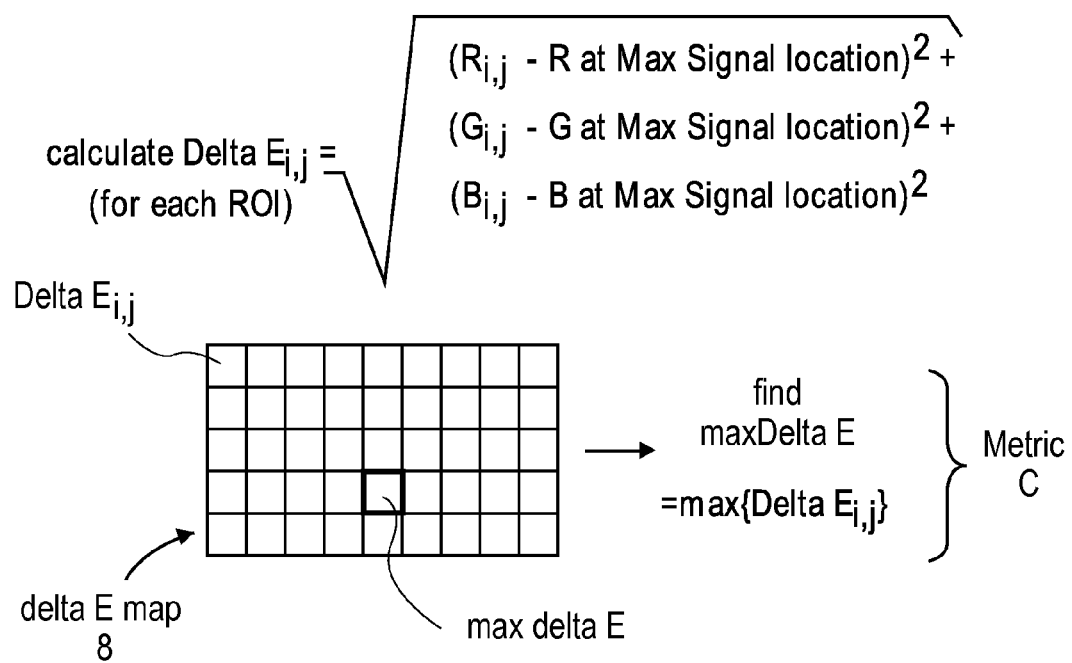
FIG. 4 shows another digital camera testing methodology using metric C.

For Metric C, referring now to FIG. 4, a deltaE map 8 is first computed. Each value $deltaE_{i,j}$ of the deltaE map 8 (at location i,j) may be computed using the equation shown in FIG. 3, which is the square root of the sum of the squares of the difference between a) the value of the scaled image 4 at location i,j and b) the value of the scaled image 4 at the location of MaxSignal (see FIG. 3), for all of the color planes. More generally, $deltaE_{14}$ gives a measure of how much each the colors in the i,j ROI, which is defined based on the scaling factor used to scale the original raw image 3 in FIG. 2, differ from their counterparts in the ROI that is at the location of MaxSignal. The greatest value in this map 8 is then found (maxDeltaE) as Metric C. If maxDeltaE is too large, then the DUT is marked as having failed the test in that it can be rejected from the production line.

Figure 5:
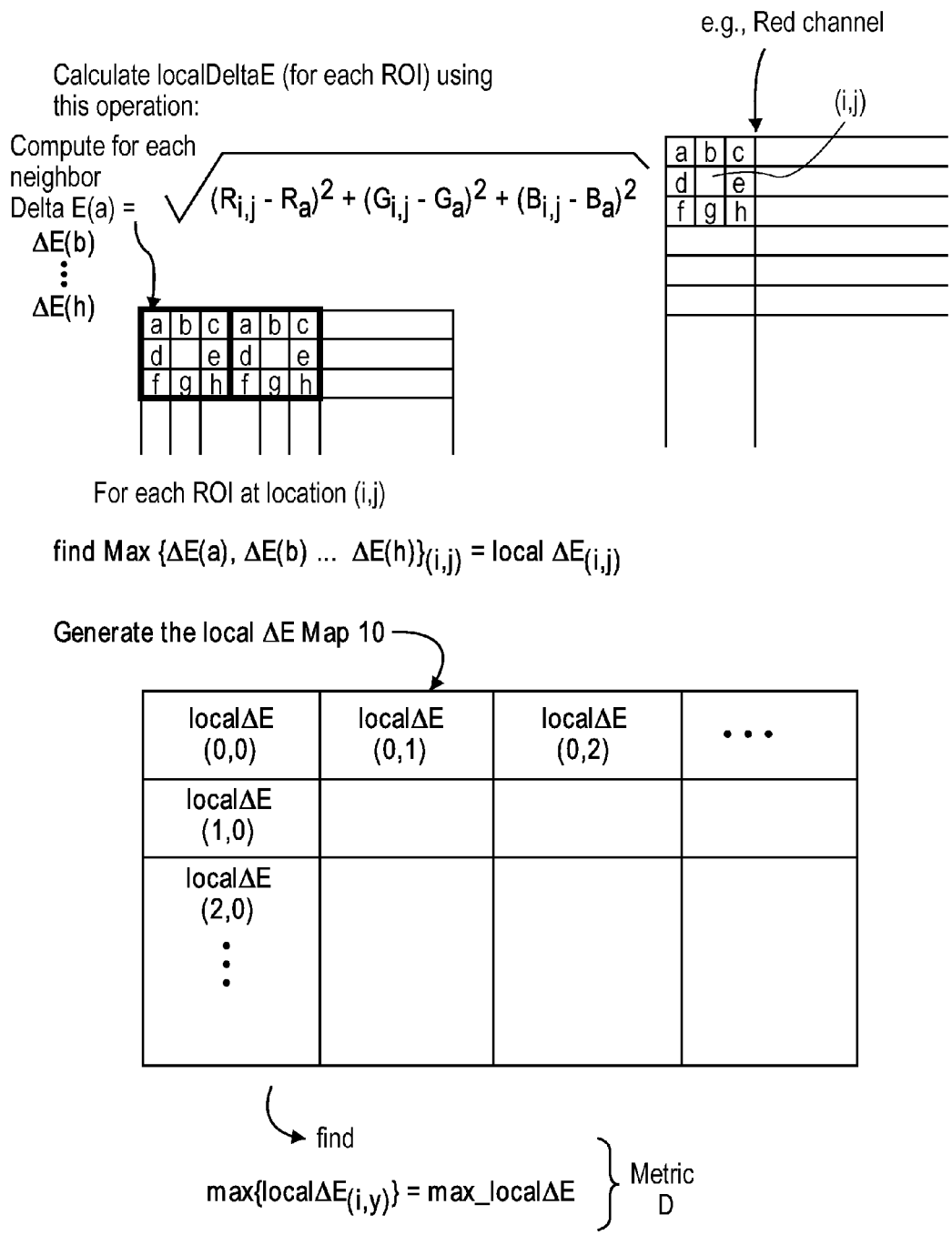
FIG. 5 illustrates yet another metric, metric D, for digital camera testing.

Turning now to FIG. 5, this diagram gives an example of how to compute Metric D. This process computes a localDeltaE map 10, and then finds the largest value in this map (Metric D) and compares it to a threshold; if it is too large then the DUT is marked as having failed the test in that it can be rejected from the production line. Now, the localDeltaE map 10 may be constructed as follows. As seen in FIG. 5, a target block having center pixel coordinates (i,j) is selected, in the scaled down images 4 of all of the color channels. In one embodiment, each block is defined as having a number of neighbor pixels, with the example here being eight (8) neighbor pixels a, b, c, . . . h, plus one center pixel at coordinates i,j. For each neighbor in a given block, a DeltaE value is computed, using for example the given equation shown in FIG. 5, namely the square root of the sum of the squares of the differences between the center value and the values of the neighbors, for all three color channels. In this case, eight (8) such DeltaE values are computed, namely DeltaE(a), DeltaE(b), . . . DeltaE(h), for a given block (having center location i,j). Next, the largest of these (8) DeltaE values is found, in each block. This value is referred to here as $localDeltaE_{i,j}$ (because it corresponds to the block at location i,j), and the collection of all such values (as needed to cover essentially all of pixels in the color planes) is the desired localDeltaE map

10. More generally, each value in the map 10, namely localDeltaE$_{i,j}$, indicates which neighbor pixel in a given block of interest exhibits the greatest difference relative to the center of that block (across the full range of color channels). For example, DeltaE(a) gives a measure of the difference between the combined colors of the center pixel and its top left neighbor a, DeltaE(b) is a measure of the difference between the center pixel and its top middle neighbor, b, etc. The largest of these DeltaE values is selected to be the localDeltaE of each block (i,j). This process is repeated to essentially cover all of the pixels in the constituent color planes, thereby populating the entire localDeltaE map 10. As explained above, Metric D is then found as the largest localDeltaE value in the map 10. It has been discovered that Metric D is more likely to fail a DUT than each of the other Metrics A, B and C.

As explained above, an embodiment of the invention may be a machine-readable medium (such as microelectronic memory) having stored thereon instructions, which program one or more data processing components (generically referred to here as a "processor") to perform the camera module DUT configuration and digital image processing operations described above including configuring the exposure setting of the camera module DUT and signaling the DUT to capture an image (of a completely dark scene), and digital image processing such as noise reduction, scaling, filtering, image combining and thresholding of the captured image. In other embodiments, some of these operations might be performed by specific hardwired logic components of the test equipment 20, e.g. dedicated digital filter blocks, hardwired state machines and programmable logic arrays. The test system operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while the defect detection techniques have been illustrated by being applied to one or more of the constituent color planes of a Bayer pattern raw image, the techniques described here may also work on a non-Bayer CFA pattern sensor, an original image that is a full color raw image (e.g., having RGB pixels directly produced by a full color imaging sensor that does not have a color filter array or color filter mosaic), a Y-channel image (e.g., derived from a YUV color space image), or a de-mosaiced or full color interpolated version of a color filter mosaic raw image. The description is thus to be regarded as illustrative instead of limiting.

What is claimed is:

1. A computerized method for testing a camera module, comprising:
 separating a plurality of constituent color planes from an original image, wherein the original image is of an essentially completely dark scene captured by the camera module;
 converting each of the constituent color planes into a respective lower resolution image; and
 processing each of the respective lower resolution images to find the largest pixel value therein and the smallest pixel value therein and computing a difference between the largest and smallest pixel values;
 comparing the computed difference for each of the respective lower resolution images with a threshold and signaling a pass or fail in response.

2. The method of claim 1 wherein the pass is signaled only if the computed difference for each one of the respective lower resolution images is less than a threshold.

3. The method of claim 1 wherein the fail is signaled whenever the computed difference for any one of the respective lower resolution images is greater than a threshold.

4. The method of claim 1 wherein the original image is a Bayer color mosaic raw image, and the constituent color planes are red, green and blue planes.

5. A computerized method for testing a camera module, comprising:
 separating a plurality of constituent color planes from an original image, wherein the original image is of an essentially completely dark scene captured by the camera module;
 converting each of the constituent color planes into a respective lower resolution image; and
 computing a signal map having a plurality of signal values, wherein each signal value gives a measure of the aggregate intensity of a plurality of different color pixel values in the respective lower resolution images, at a common pixel location; and
 processing the signal map to find the largest signal value therein, comparing it with a threshold, and signaling a pass or fail in response.

6. The method of claim 5 wherein computing the signal map comprises computing the square root of the sum of the squares of the plurality of different color pixel values.

7. The method of claim 5 wherein the pass is signaled when the largest signal value is greater than the threshold, and the fail is signaled when the largest signal value is smaller than the threshold.

8. The method of claim 5 wherein the original image is a Bayer color mosaic raw image, and the constituent color planes are red, green and blue planes, and the plurality of different color pixel values are red, green and blue values.

9. The method of claim 5 further comprising:
 computing a difference signal map having a plurality of difference signal values, wherein each difference signal value gives a measure of an aggregate, for all of the constituent color planes, of the difference in intensity between i) a pixel value at a given location in one of the constituent color planes and ii) a color pixel value at a location in the same constituent color plane that corresponds to that of the largest signal value found in the signal map; and
 processing the difference signal map to find the largest difference signal value therein, comparing it with a threshold, and signaling a pass or fail in response.

10. The method of claim 9 wherein computing one of the difference signal values comprises:
 computing the square root of the sum of the squares of the differences between i) a pixel value at a given location in one of the color planes and ii) a pixel value at a location in the same color plane that corresponds to that of the largest signal value found in the signal map.

11. A computerized method for testing a camera module, comprising:
 a) separating a plurality of constituent color planes from an original image, wherein the original image is of an essentially completely dark scene captured by the camera module;
 b) converting each of the constituent color planes into a respective lower resolution image; and
 c) computing a plurality of intra-block neighbor difference values for the same block location in the constituent color planes, wherein each intra-block neighbor difference value gives a measure of an aggregate, across all of the constituent color planes, of the difference in intensity between i) an inner pixel in a block at said block location and ii) an outer pixel in the same block;

d) finding the largest intra-block neighbor difference value computed in c);

e) repeating c) and d) for a plurality of block locations in the constituent color planes to form a local difference map that contains the largest intra-block neighbor difference values found in each iteration of d); and processing the local difference map to find the largest intra-block neighbor difference value therein, comparing it with a threshold, and signaling a pass or fail in response.

12. The method of claim 11 wherein the block is a 3×3 block of pixels in which the inner pixel is at the center of the block.

13. The method of claim 11 wherein computing one of the intra-block neighbor difference values comprises:

computing the square root of the sum of the squares of the differences between an inner pixel of a given color and a particular outer pixel of the same color in the same block, for all of the constituent color planes.

* * * * *